(12) United States Patent
Flack

(10) Patent No.: US 10,198,528 B2
(45) Date of Patent: *Feb. 5, 2019

(54) METHODS AND APPARATUS FOR ACCELERATING CONTENT AUTHORED FOR MULTIPLE DEVICES

(71) Applicant: Akamai Technologies, Inc., Cambridge, MA (US)

(72) Inventor: Martin T. Flack, San Francisco, CA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/725,711

(22) Filed: Oct. 5, 2017

(65) Prior Publication Data

US 2018/0089327 A1    Mar. 29, 2018

Related U.S. Application Data

(63) Continuation of application No. 13/775,074, filed on Feb. 22, 2013, now Pat. No. 9,817,916.

(60) Provisional application No. 61/601,974, filed on Feb. 22, 2012.

(51) Int. Cl.
*G06F 17/30* (2006.01)
*H04L 29/08* (2006.01)

(52) U.S. Cl.
CPC .. *G06F 17/30905* (2013.01); *G06F 17/30896* (2013.01); *G06F 17/30899* (2013.01); *H04L 29/0809* (2013.01); *H04L 67/02* (2013.01); *H04L 67/28* (2013.01); *H04L 67/2804* (2013.01); *H04L 67/2819* (2013.01)

(58) Field of Classification Search
CPC ......... G06F 17/30867; G06F 17/30899; G06F 17/30896; H04L 67/02; H04L 67/04; G06Q 10/10
See application file for complete search history.

(56) References Cited

U.S. PATENT DOCUMENTS 7,231,644 B2    6/2007  Keiffer
7,299,411 B2 *  11/2007 Blair ................. G06F 17/211
                                                348/E7.073
7,653,875 B2 *  1/2010  Jennings ........... G06F 17/30899
                                                715/200

(Continued)

OTHER PUBLICATIONS

U.S. Appl. No. 13/775,074, filed Feb. 22, 2013 available in IFW.

(Continued)

*Primary Examiner* — Ramy M Osman

(57) ABSTRACT

Disclosed herein are systems, methods, and apparatus for improving the delivery of web content that has been authored for multiple devices. In certain embodiments, an intermediary device such as a proxy server determines the characteristics of a client device requesting multi-device content, obtains and examines the multi-device content, and in view of the particular requesting client device removes portions that are irrelevant for that device. Doing so can accelerate delivery of the content by reducing payload and relieving the client device of the processing burden associated with parsing the content to make that determination itself, among other things.

16 Claims, 5 Drawing Sheets

(56) References Cited

U.S. PATENT DOCUMENTS

| | | | | |
|---|---|---|---|---|
| 8,640,094 B2* | 1/2014 | Burckart | G06F 8/70 | 717/120 |
| 8,959,427 B1* | 2/2015 | Carlsson | G06F 17/3089 | 715/236 |
| 9,405,555 B2 | 8/2016 | Livshits | | |
| 9,418,353 B2* | 8/2016 | Flack | G06Q 10/10 | |
| 9,471,552 B1 | 10/2016 | Kolam et al. | | |
| 9,785,621 B2 | 10/2017 | Podjarny | | |
| 9,817,916 B2* | 11/2017 | Flack | G06F 17/30905 | |
| 2006/0184639 A1* | 8/2006 | Chua | G06F 17/30905 | 709/217 |
| 2006/0230344 A1* | 10/2006 | Jennings | G06F 17/30899 | 715/201 |
| 2007/0214237 A1* | 9/2007 | Stibel | G06F 17/3087 | 709/217 |
| 2007/0226612 A1* | 9/2007 | Sun | G06F 17/30905 | 715/210 |
| 2009/0210498 A1* | 8/2009 | Sze | H04L 67/04 | 709/206 |
| 2009/0307750 A1* | 12/2009 | Marueli | G06F 17/30867 | 726/3 |
| 2012/0203861 A1* | 8/2012 | Flack | G06Q 10/10 | 709/217 |
| 2012/0246588 A1* | 9/2012 | Petersen | G06Q 30/02 | 715/769 |
| 2013/0219024 A1* | 8/2013 | Flack | H04L 67/02 | 709/219 |
| 2016/0150013 A1 | 5/2016 | Kolam et al. | | |
| 2018/0089327 A1* | 3/2018 | Flack | G06F 17/30896 | |

OTHER PUBLICATIONS

Transmittal Letter titled Information Disclosure Statement / MPEP 609, submitted from Applicant with this SB/08 form, Oct. 5, 2017.

* cited by examiner

METHODS AND APPARATUS FOR ACCELERATING CONTENT AUTHORED FOR MULTIPLE DEVICES

REFERENCE TO RELATED APPLICATIONS

This application is a continuation of U.S. application Ser. No. 13/775,074, filed Feb. 22, 2013, which claims the benefit of priority of U.S. Provisional Application No. 61/601,974, filed Feb. 22, 2012, the teachings of both of which are hereby incorporated by reference in their entireties.

This patent document contains material which is subject to copyright protection. The copyright owner has no objection to the facsimile reproduction by anyone of the patent document, as it appears in Patent and Trademark Office patent files or records, but otherwise reserves all copyright rights whatsoever.

BACKGROUND

Technical Field

This application relates generally to distributed data processing systems and to the delivery of web content over computer networks.

Brief Description of the Related Art

The client-server model for obtaining content over a computer network is well-known in the art. In a typical system, a host server makes content (e.g., website content) available to requesting clients. The client device sends a request for a given piece of content (e.g., an HTML document, or embedded objects such as images, scripts, etc.). The server responds to the client with the requested content.

In the past, most client devices were desktop computers, and thus existed within a fairly narrow set of form-factors, feature-sets, capabilities, and the like. More recently, however, the scope and diversity of client devices has rapidly expanded, due largely though not exclusively to the proliferation of mobile devices. For example, smartphones are available in an increasingly wider array of shapes and sizes. Tablets are also increasingly popular. But web content originally authored for desktop devices is often subpar for mobile devices, which generally have smaller screen sizes and often reduced—or at least very diverse—set of capabilities.

The issue extends beyond mobile devices, it should be noted. For example, televisions and other connected devices are also increasingly web-enabled, whether or not using wireless or wireline connections. Delivering content to these client devices can present similar challenges. For convenience, the description herein will often refer to mobile client devices; however, the teachings hereof are not so limited.

Typically, web content has been adapted for mobile devices through the authoring process (e.g., a web designer authoring several versions of content in the first instance, in some cases making a "desktop" version of a website and a "mobile" or "m.dot" version of the site), or through an automated transcoding process. While content adaptation remains one approach for handling such traffic, an alternative approach is multi-device authoring. Multi-device authoring embraces the notion of one version of content and instructions (both on the client and server side) that is meant to handle traffic for more than one kind of device (e.g., desktop, tablet, and smartphone traffic, etc.), displaying the content appropriately in each instance. Preferably, a single version of content and instructions is used for multiple devices, or ideally, all devices.

More recently, the term "Responsive Design", also known as "Adaptive Design", has been popularized to refer to a multi-device authoring approach for web design. Responsive Design refers to web design that speaks to the problem of addressing a variety of client devices (mobile devices, tablets, desktop, connected devices, etc.), using, e.g., certain enhanced design principles and functionality.

Non-limiting examples of Responsive Design principles and features are listed below.

CSS3 Media Queries, allowing a client device to selectively apply cascading style sheet (CSS) blocks using logic dependent on, for example, client device characteristics. A collection of such media-query dependent blocks in the same page styling can then make the page adapt to different devices or desktop window sizes. A media query typically contains a logical expression which evaluates to true or false. The associated block of CSS rules will be applied (or not) based on the client device's evaluation of the expression. An example of a CSS media query is as follows:

@media (min-width: 500 px) and (orientation: landscape) {[CSS rules]}

In this example, if the client device has a minimum screen width of 500 pixels and the screen orientation is landscape, the enclosed CSS rules will be applied. Otherwise, they will be ignored.

Fluid Grid, giving designers a system to deal with grid layout reliably across browsers, and encouraging the expression of all units in percentage terms.

Fluid Images, giving designers a technical way to resize images with nice graphical treatment across browsers, removing the need to bring an image into an image editor to get good resizing treatment.

These features are typically found on newer browsers, although in some instances, Javascript libraries have also appeared that "back port" such functionality to older web browsers, so they are not limited to certain browsers. Websites employing these principles often target the wave of smartphones, tablets, televisions, and other devices that offer HTML4 and HTML5 web browsers. Indeed, sites employing this kind of design are sometimes referred to as "HTML5 sites."

While multi-device authoring is convenient for creating and maintaining content, performance can be an issue. Websites built in this fashion tend to push the same payload to both desktop and mobile devices, and this payload tends to represent the size required to render on the desktop's larger screen. Furthermore, the payload tends to be higher than normal web pages as multiple CSS or other instructions are included.

There is a need to enhance performance of content authored for multiple devices, and in particular sites using Responsive Design principles. The teachings hereof address this need and offer other advantages and functionality that will become clearer in view of this disclosure.

BRIEF SUMMARY

Disclosed herein are systems, methods, and apparatus for improving the delivery of web content that has been authored for multiple devices. In some embodiments, an intermediary device such as a proxy server determines the characteristics of a client device requesting multi-device content, obtains and examines the multi-device content, and in view of the particular requesting client device removes portions that are irrelevant for that device. Doing so can accelerate delivery of the content by reducing payload and relieving the client device of the processing burden associated with parsing the content to make that determination itself, among other things.

In one embodiment, a method operative in a networked computer device involves receiving a request for content (e.g. an HTTP 'Get' request for an HTML document or external CSS file) from a client device and using information in the request to determine characteristics of the client device (such as browser window width or height, screen width or height, display characteristics, user interface characteristics, or others). The content is obtained (e.g., from cache, from an origin server, or otherwise). The content includes at least one logical expression, such as a CSS media query, that conditions the client device's application of code (such as a CSS rule) on one or more client device characteristics. The logical expression is evaluated it is determined that the code is not applicable, based on the known characteristics of the client device. Hence, the code is removed from the content. Preferably this distillation process reduces the size (e.g., in bytes) of the content and also reduces complexity (e.g., since the logical expression can be removed too, the client device will not have to evaluate it). The modified code (minus the removed code) is sent to the client device. The modified content can be cached for use in response to subsequent requests.

In some cases, the method further includes removing an HTML element logically identified by the code. For example, the method may include receiving a second request for an HTML document from a second client device, determining one or more characteristics of the second client device using information received with the second client device's request for the HTML document, modifying the HTML document by removing HTML logically identified by the code, and sending the HTML document content to the second client device in response to the second client device's request.

In another embodiment, a method operative in an intermediary device connected to a computer network involves receiving a request for content from a client device, the requested content comprising an HTML document, and determining one or more characteristics of the client device using information received with the client device's request for content. The HTML document is requested and received from an origin server. The HTML document has an HTML element that either (a) includes hint information indicating when to remove the HTML element, based on one or more client device characteristics, and/or (b) is associated with hint information specified in a configuration at the intermediary device that indicates when to remove the HTML element, based on one or more client device characteristics. The intermediary device looks at the information and determines that the code is not applicable, based on the determined characteristics of the client device. It modifies the HTML document by removing at least a portion (potentially all) of the HTML element, and sends the modified HTML document to the client device. The portion of the HTML element that is removed might be the information that indicates when to remove the HTML element, and/or one or more HTML elements nested in the HTML element that are of one or more types of HTML tag, the one or more types being specified by the information.

The hint information can be, for example, a logical expression dependent on one or more client device characteristics, or a flag indicating that the HTML element can be removed if the intermediary device has determined that CSS associated with the HTML element is inapplicable to the client device.

The foregoing is by way of general illustration and overview and is not limiting. The claims define the scope of protection that is sought. The teachings hereof may be realized in a variety of systems, methods, apparatus, and non-transitory computer-readable media.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

Introduction

As previously mentioned, web sites built using a multi-device authoring approach tend to push the same payload to both desktop and mobile devices (indeed to all devices), and this payload tends to represent the size required to render on the desktop's larger screen. The payload tends to be higher than normal web pages because multiple CSS or other instructions are included.

Furthermore, because the essential appeal of multi-device authoring is to maintain a multipurpose set of files (e.g., CSS, HTML, image/video assets) that are applied to multiple kinds of devices, it is in tension with the idea of customizing downloads (e.g., content adaptation) for different devices.

In accordance with the teachings hereof an intermediary device, such as a reverse proxy server, can modify a multi-device page (and potentially embedded objects) as it passes through. The intermediary can make it appear that a customized version of a multi-device page had been created for the particular client device (e.g., smartphone, tablet, etc.)

making the request. Doing so not only reduces the payload and corresponding last-mile transfer time, but can also reduce processing load on the client device, allowing for faster page rendering.

In one implementation, a content delivery network (CDN) proxy server can be modified in accordance with the teachings hereof to implement the teachings hereof. A CDN proxy server represents one implementation but the application is not limited to the use of CDN proxy servers or to (non-CDN) proxy servers. Because a CDN proxy server is a useful example, though, a CDN system is described below with respect to FIGS. 1-2.

It should be understood that the teachings hereof may also be implemented in an intermediary module within a web server. For example, the teachings hereof may be implemented in a web server plugin that logically resides in between the client device and the web server. The plugin modifies outgoing content as it passes through, just as the intermediary device does.

Content Delivery Network

Figure 1:
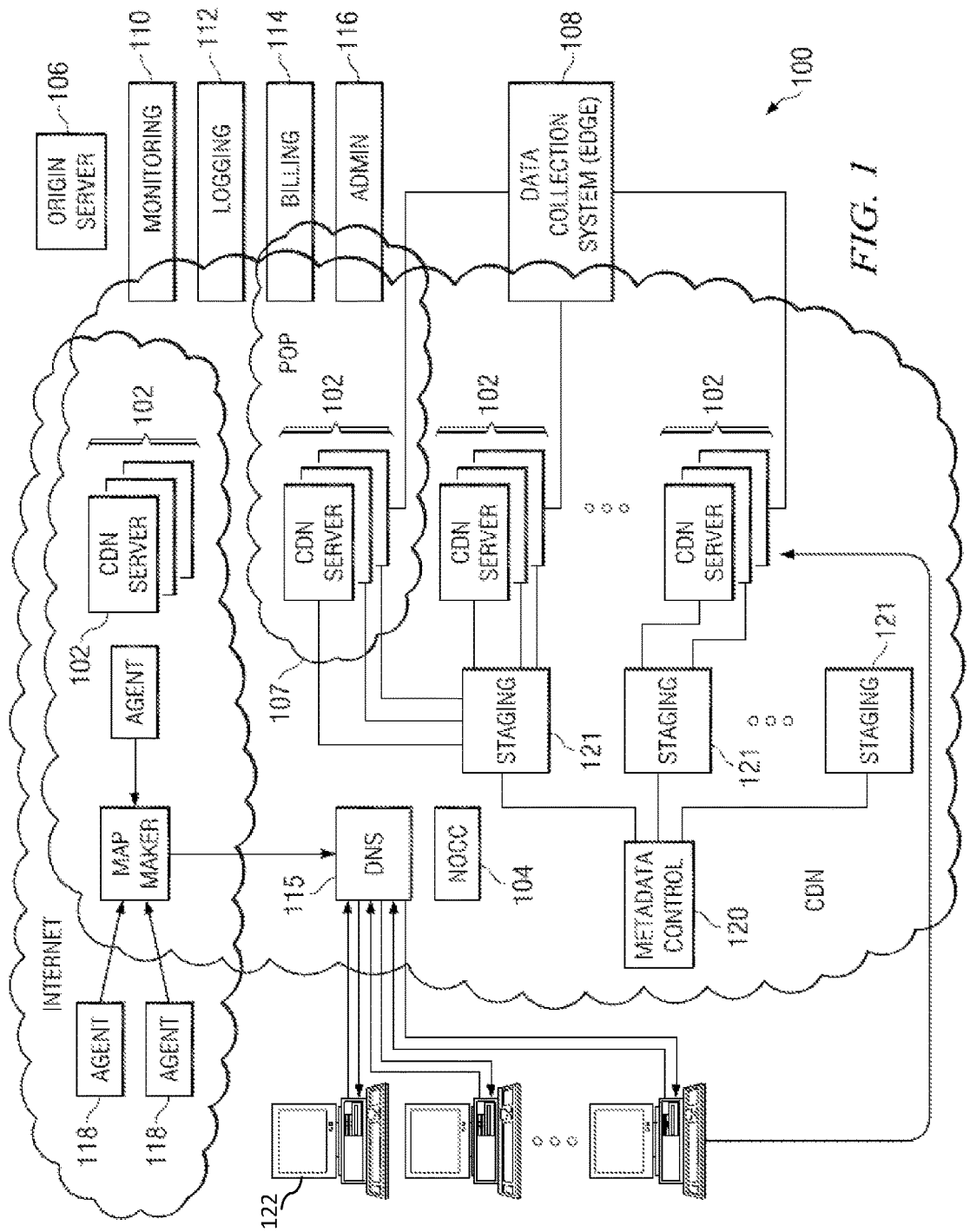
FIG. 1 is a schematic diagram illustrating one embodiment of a known distributed computer system configured as a content delivery network.

In the system shown in FIG. 1, a distributed computer system 100 is configured as a content delivery network (CDN) and has a set of machines 102 distributed around the Internet. Typically, most of the machines are configured as servers and located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., hypertext markup language—HTML—or other markup language files, embedded page objects, streaming media, software downloads, and the like) to the distributed computer system 100 and, in particular, to the servers (which are sometimes referred to as content servers, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client machines 122 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the CDN servers.

Figure 2:
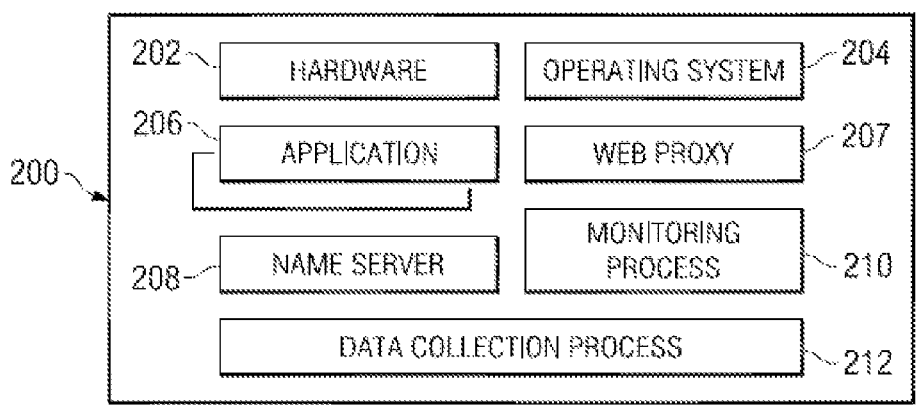
FIG. 2 is a schematic diagram illustrating one embodiment of a machine on which a CDN server in the system of FIG. 1 can be implemented.

As illustrated in FIG. 2, a given machine 200 in the CDN comprises commodity hardware (e.g., a processor) 202 running an operating system kernel (such as Linux® or variant) 204 that supports one or more applications 206a-n.

To facilitate content delivery services, for example, given machines typically run a set of applications, such as an HTTP proxy 207, a name server 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine typically includes one or more media servers, such as a Windows® Media Server (WMS) or Flash® 2.0 server, as required by the supported media formats.

A given CDN server shown in FIG. 2 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. Nos. 7,240,100 and 7,111,057, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who is associated with or operates the origin server.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously.

As an overlay, the CDN server resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on deployed hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's Intranet. This kind of solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference.

Accelerating Multi-Device-Authored Content

In one embodiment, a module in an intermediary device such as a proxy server is equipped with logic to adjust presentation layer files based on the following concepts.

The proxy server can remove data from the payload based on modifications to the presentation layer that are performed on the multi-device-authored web page as the page passes through the proxy. The proxy server is aware of the client-device connecting to it, and can determine its characteristics (e.g., its hardware and software capabilities). The proxy uses this information to distill the payload appropriately for the given client device. The resultant payload should then be faster to transmit, especially over wireless connections, and especially when work is cached so that an amount of calculation latency is recovered profitably over some number of requests.

Ideally a content provider need not provide any special markup of a page for the proxy. Exceptions or special instructions can be expressible in configuration information for the proxy, such as the metadata for the CDN server described previously.

Figure 3A:
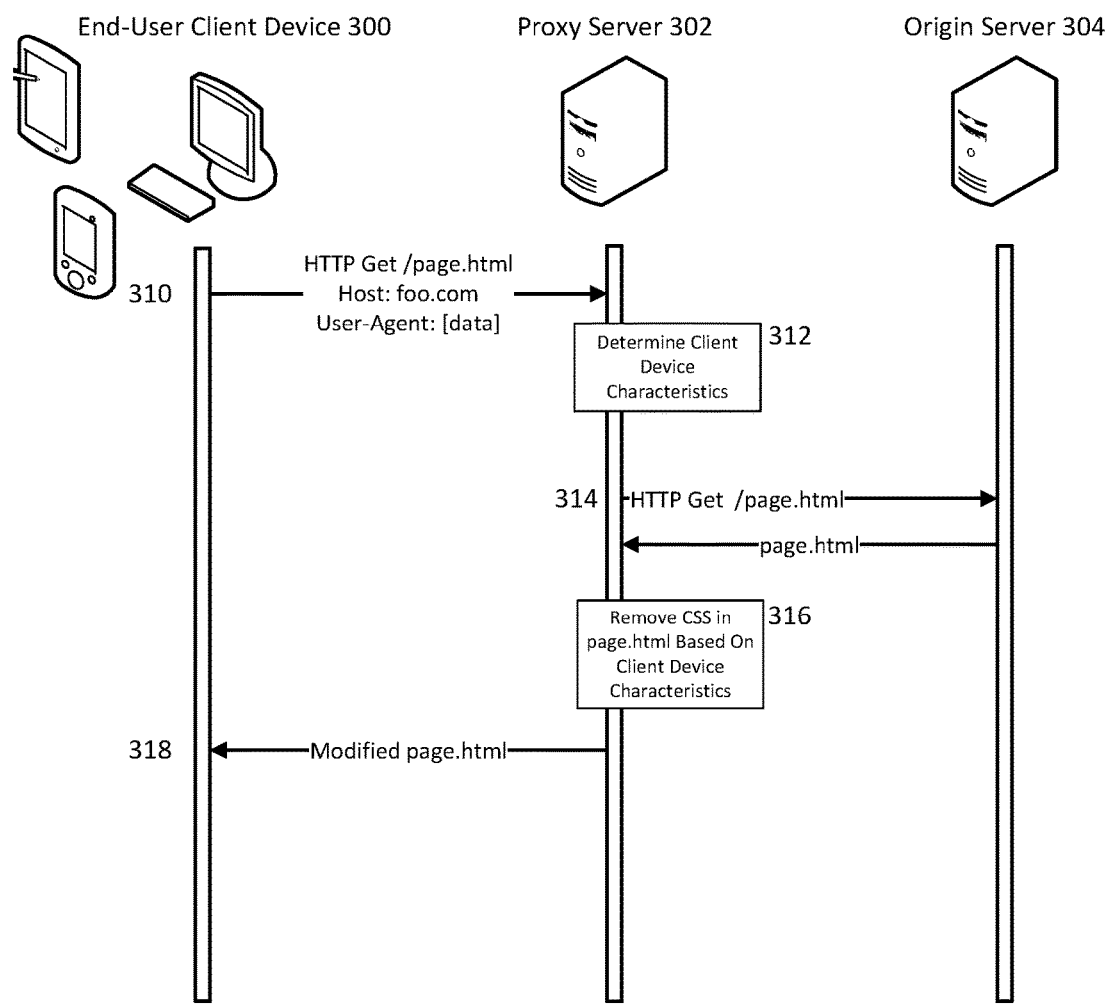
FIG. 3A is a schematic diagram illustrating one embodiment of message flow amongst a client, proxy server, and origin server in accordance with the teachings hereof.
Figure 3B:
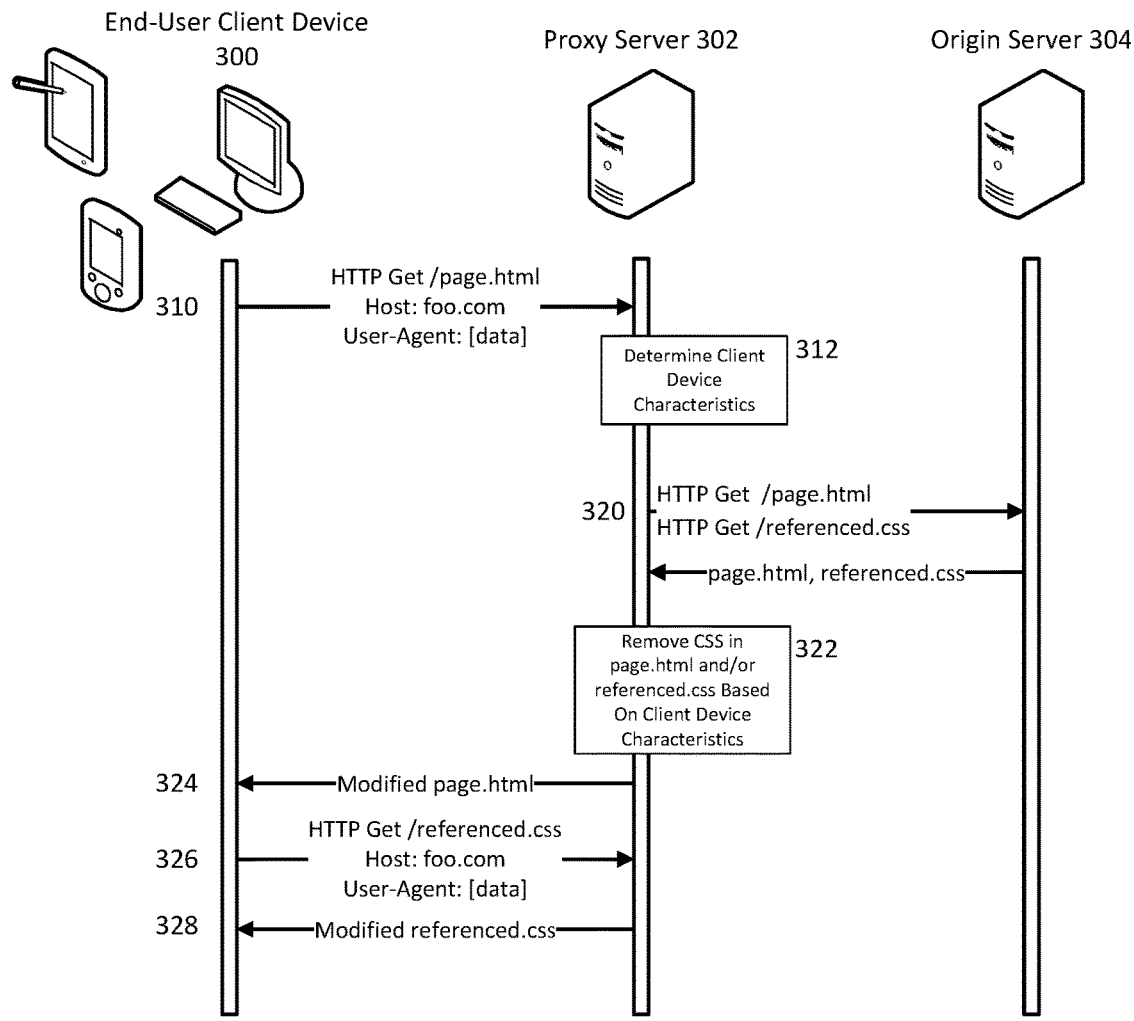
FIG. 3B is a schematic diagram illustrating one embodiment of message flow amongst a client, proxy server, and origin server in accordance with the teachings hereof.

FIGS. 3A and 3B illustrate, in non-limiting embodiments, high-level views of message flows. Referring to FIG. 3A, an end-user client device 300 makes an HTTP 'Get' request for a particular html page to a proxy server 302 handling the 'foo.com' domain (310). The proxy server receives this request and determines certain characteristics of the client device (312). The illustrated example leverages [data] in the User Agent header field, but this is merely one example and device detection & characterization can be implemented in many ways and will be described in more detail below.

Assume that the requested content has not been cached locally or the cached copies are expired. At 314, the proxy server makes a forward request for page.html. The page references CSS that is, for example, either inline in the HTML head section, in an HTML element, and/or in an external CSS file. Of course, CSS may exist in any or all of these places at once—they are not mutually exclusive.

FIG. 3A is an example focusing on treatment of CSS that is inside the HTML. The proxy server examines the CSS and the HTML, and portions of the HTML and/or CSS are modified based on the proxy server's knowledge of the client device connecting to it (316). More detail about examining and modifying the HTML and/or CSS are provided below, but typically the modifications involve removing portions of CSS code that is moot for the given client device, and/or removing HTML elements associated with the moot CSS code. The modified content is then sent to the client device (318).

FIG. 3B illustrates the situation where CSS is in an external file referenced in the HTML. In this embodiment, the referenced external CSS file is pre-fetched by the proxy server along with the HTML (320). At 322, the HTML and/or CSS is examined and portions of the HTML and/or CSS are modified based on proxy server's knowledge of the client device connecting to it. The modified page.html is then sent to the client device (324), and the external CSS file 'referenced.css' is sent in response to a subsequent request by the client device (326, 328).

In a variation, the proxy server does not pre-fetch the external CSS file. Rather, the HTML is requested and relayed to the client device. When the client requests the CSS it is analyzed and distilled. The HTML has already been sent so it cannot be modified based on an analysis of the CSS, but on a subsequent request for the same HTML document from another client device, it can be.

Techniques

Image Resizing

Many images prepared at resolutions appropriate for the desktop viewing experience will be reduced in size to comply with web browser box model layouts resulting from the cascading style sheets (CSS). In the multi-device authoring model, these resizing actions are often performed client-side with Javascript, resulting in wasted payload.

Because of the quadratic nature of screen space, an image rendering in half as much width is saving much more than half the pixels—a square is saving three quarters of its pixels. This means that file sizes can be much reduced, as well as reducing/eliminating client-side processing time for resizing.

Because the proxy server will reduce the image from whatever size it started, the reduction at the proxy need not fit the precise web browser box model end-result; simply resizing the image down to the screen width (or other relevant limiting dimension) of the requesting client device, if larger, may result in a performance gain, since it does not make sense to send a device an image which it cannot render at regular size.

Certain exceptions such as orientation switching and zoomable images make the situation more complex, but are possible to overcome with a conservative approach or some configuration settings in accord with content provider preference (e.g., settings that would exclude certain content from resizing treatment).

Image Selection

In some instances, a page may contain code (such as Javascript) instructing the client to select and get one of several differently-sized image resources based on the client's characteristics. A device-aware proxy server can make this decision for the client, remove the code, and replace it (inline or with URI, for example) with an appropriately sized image. This again not only reduces payload by sending a smaller image, but relieves the client of executing the code when it renders the page. This approach applies equally to resources other than images.

CSS Eliding

A mobile device is constrained in maximum sensible screen width and height, whereas the multi-device authored page has been designed to address this dimension, in addition to larger dimensions, such as for a desktop device. Therefore, the CSS contains moot sections that may be elided.

The effects of eliding moot CSS are enhanced if the CSS contains inline images, either from origin, or from a prior logical pass in proxy server software (e.g., a front-end optimization treatment applied to convert embedded image references to inlined images).

Pattern-detection can be used to identify CSS3 Media Queries.

Because of CSS instructions that become moot in the context of a particular client device, certain sections of HTML may be moot. For example, a complex navigation structure may be hidden in a mobile version of a page, or hover-over menus may be inaccessible on a tablet. This leads to the notion that these portions of HTML may be removed too.

HTML Eliding

Certain portions of the HTML may be guaranteed to remain "display: none" in the browser (in CSS terms) and therefore can be removed. It is possible that Javascript may reveal an artifact originally hidden at load, necessitating access to that portion of HTML, or that CSS instructions from a linked file may also target that portion of HTML. Hence, a conservative strategy could be employed, and only alter the page when it could be ascertained that this is extremely unlikely, or alternatively operate on instructions specified in configuration information, or operate on special markup in the HTML (provided by a content provider or otherwise). With respect to the latter, in some embodiments the content provider can provide annotations or hints for certain portions of the HTML indicating that those portions are safe to remove for certain client devices, or safe to remove where corresponding CSS is determined to be moot, or for other reasons. For example, a hint placed in a <DIV> tag could control the elision of that entire element. The format of the hints might be similar to that of CSS media queries in that the syntax may allow an author to specify a logical expression dependent on characteristics of the client device. If the expression evaluates to 'true', for example, the HTML element can be kept, and if 'false', the HTML element is safe to remove.

Example Algorithm 1 for Proxy or Other Intermediary

1. Upon receiving a request, consult a device detection and characterization database and retrieve characteristics for the currently-requesting device. This may be accomplished using known products and/or techniques that identify a client device based on information in a user-agent HTTP header field (or UA profile, or other information in the request) sent from the client at request time, and then look up a set of characteristics for the given client device. Non-limiting examples of products that are used to identify and characterize client devices include Device Atlas and WURFL (Wireless Universal Resource FiLe).

Alternatively, a device detection and characterization database can be built by testing client devices to capture their user agent and storing this information in the database, along with known characteristics of the device (e.g., obtained by buying the particular device or getting information about it from the manufacturer or other sources). The completed database then can be used to look up a set of characteristics using the user agent header as the key. In another embodiment, the characteristics of the client device could be declared explicitly in a header sent by the client device to the intermediary.

Client device characteristics might include such things as screen dimensions, JavaScript support, browser name and/or version, or other characteristics, relating to the device hardware and/or software running on the device and the device's capabilities. Other examples of the kinds of characteristics that may be made available about a particular identified client device include: operating system name and/or version, processor name and/or version, the form factor of the device (e.g., smartphone, tablet, laptop), model name or manufacturer, user interface details (e.g., touchscreen availability, trackball, audio features, etc.), release date, connectivity/protocol information (e.g., WiFi enabled, 3G-capable), information about how the device renders/displays markup languages like html, wml, xhtml, or others, what support the device offers for AJAX technologies (e.g., Javascript support, event listening support, CSS manipulation support), further screen information like display resolution and whether the display has dual orientation capability, support for content formats (including multimedia), how the device handles certain transactions such as authentication and HTTP post, information about the client device's cache, whether the device has a camera, or other hardware (processor, memory, etc.) features, whether particular software is installed, and so on.

2. Reduce image dimensions that are larger than the largest of width or height, maintaining aspect ratio, thereby reducing image file size. In some embodiment, allow server configuration data (e.g., CDN metadata) to set a more aggressive option that refers to the width, meaning that in landscape mode the images will be of a slightly lesser resolution than they could be. Allow images to be blacklisted by URL pattern, and pages on which images may appear, for this treatment.

3. Remove CSS3 Media Query blocks that are irrelevant based on evaluation of the media query logic with knowledge of the requesting device's screen size, currently requested media type, and/or other characteristics. A non-limiting example of this is described in more detail in the section below titled "Example of CSS Eliding".

Example Algorithm 2 for Proxy or Other Intermediary ( . . . in addition to the above items . . . )

4. Make assertions regarding web browser box model layout for images and resize to smaller dimensions than maximum screen dimensions.

5. Remove CSS blocks with the suffix ":hover" that are irrelevant because the currently requesting client device is touch-only, such as an Apple iPad. Allow blacklisting of CSS blocks for this treatment so that certain CSS blocks are never removed.
6. Remove HTML elements that the proxy determines, based on its knowledge of requesting client, would not be displayed by the client device in compliance with the CSS, and not mentioned in any Javascript blocks according to normal DOM and jQuery call syntax. Allow blacklisting HTML elements, and pages on which they may appear, for this treatment. A non-limiting example of this is described in more detail in the section below titled "Example of HTML Eliding By CSS Reference".
7. Remove HTML elements that have been hinted with HTML tag attributes by the content author. A non-limiting example of this is described in more detail in the section below titled "Example of HTML Eliding By Hinting".

Note that the results of applying the above-algorithm may be cached at the proxy server (e.g., using one or more characteristics of the device as part of a cache-key) for use in servicing later requests from the same or similar client devices.

Example of CSS Eliding

The following is an example snippet from an HTML document:

```
...
<style>
.menu {
    display: none;
}
@media (min-width: 600px) {
    .menu {
        display: block;
        background-color: #eeeeee;
        font-weight: bold;
    }
}
</style>
...
```

In this snippet, the first CSS rule directs that HTML elements with a CSS class of "menu" (the menu items) should be hidden in the general case. Following this, a CSS Media Query conditioned on the client browser viewing area being at least 600 pixels wide wraps a CSS rule that makes the menu items visible and further sets a background color and font weight, all of which are standard CSS directives. It is worth noting that the interior of the CSS Media Query could have held further CSS rules which could have taken up more document characters to go on to describe many page alterations for this size of screen, including possibly image data inlined into the CSS; the example here is short for simplification of the explanation.

Given a mobile device having a 320×480 pixel screen making a request for this HTML page to a responsive design accelerator enabled proxy, the following actions would occur:

The content of the User-Agent HTTP header in the HTTP request is provided to a device database system, which returns, potentially among other data, a screen width of 320 pixels and a screen height of 480 pixels.

The document in question would be retrieved from local memory, local disk, a peer server by network request, a parent server by network request, or an origin server, or otherwise. The following steps may take place with the entire document available or in suitable chunks as they are available (e.g., from the network interface).

Given that this example CSS Media Query is conditioned to be applicable on the final client at screen widths that are at least 600 pixels wide, the proxy determines that the web browser software on the example mobile device making this request is, in compliance with CSS, not going to apply the CSS instructions enclosed in the CSS Media Query when executing the rendering of this web page.

In a conservative approach, the proxy may also consider the height of the device, at 480 pixels for this example, in the event that the user is holding, or will turn, the client device from portrait orientation into landscape orientation. Even in this case, however, 480 is less than 600, so the assertion developed above still stands.

The proxy then alters the HTML document by removing the characters associated with the CSS Media Query block, in its entirety, and possibly one or more whitespace characters surrounding it, such as the leading and trailing newline characters.

This produces the following output for this snippet, which is shorter than the original:

```
...
<style>
.menu {
    display: none;
}
</style>
...
```

By the repeated application of this technique on the CSS enclosed in the HTML or in a CSS file, the document is made shorter and therefore ultimately made faster to transmit to and render on a mobile device.

Example of HTML Eliding by CSS Reference

The following is an example snippet from an HTML document:

```
...
<head>
<style>
.menu {
    display: none;
}
@media (min-width: 600px) {
    .menu {
        display: block;
        background-color: #eeeeee;
        font-weight: bold;
    }
}
</style>
</head>
<body>
    <h1>Hello, World.</h1>
    <div class="menu">
        <h2>Menu</h2>
    </div>
</body>
...
```

Building on the example of CSS Eliding presented previously, in this further developed snippet, there is a single DIV tag that is marked as class "menu" that applies to the CSS rules above. It is worth noting that the DIV element may contain much more HTML than is shown here for example.

In addition to the CSS Eliding, the proxy could impute that the DIV in question has CSS rules applied that make it hidden, and that other CSS rules that might make the DIV appear have been removed, and therefore that the DIV itself may be removed.

The output, for a device with a 320×480 viewing area, would be:

```
...
<head>
<style>
.menu {
    display: none;
}
</style>
</head>
<body>
    <h1>Hello, World.</h1>
</body>
...
```

This again is shorter than the original snippet.

Example of HTML Eliding by Hinting

The following is an example snippet from an HTML document:

```
...
<body>
    <h1>Hello, World.</h1>
    <div class="menu" data-rda-apply="(min-width: 600px)" data-rda-else="elide">
        <h2>Menu</h2>
    </div>
</body>
...
```

Here is a situation where HTML Eliding is triggered by one or more HTML tag attributes, added by the HTML author, conforming to a grammar understood by the proxy server. The exemplary attributes "data-rda-apply" and "data-rda-else" are named with a prefix of "data-" to comply with an industry-suggested HTML5 data attribute specification, but this prefix is largely for authoring convenience rather than rendering correctness, as the proxy would remove them in any case.

The "data-rda-apply" attribute uses identical grammar to the CSS Media Queries. When the CSS Media Query contained in the attribute evaluates to 'true', the HTML element in which it appears should not be removed. Otherwise, it is asserted by the author to be safe to remove. In either case, the hint attributes are removed.

The "data-rda-else" attribute displays a keyword "elide" which means in cases where an HTML element's "data-rda-apply" attribute, when taken as a CSS Media Query, would presumably evaluate to false on the client device, the proxy should remove the entire HTML element.

An alternative keyword grammar for "data-rda-else" may indicate removal of nested HTML elements corresponding to HTML tag names listed in parentheses, an example being data-rda-else="elide-tags(img)" to remove image tags within the original HTML element (but not the element itself, or anything else inside the element) as well as the hint attributes.

The output, using the above hinted example, and for a device with a 320×480 viewing area, would be:

```
<body>
    <h1>Hello, World.</h1>
</body>
...
```

This again is shorter than the original snippet.

Computer Based Implementation

The clients, servers, and other computer devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
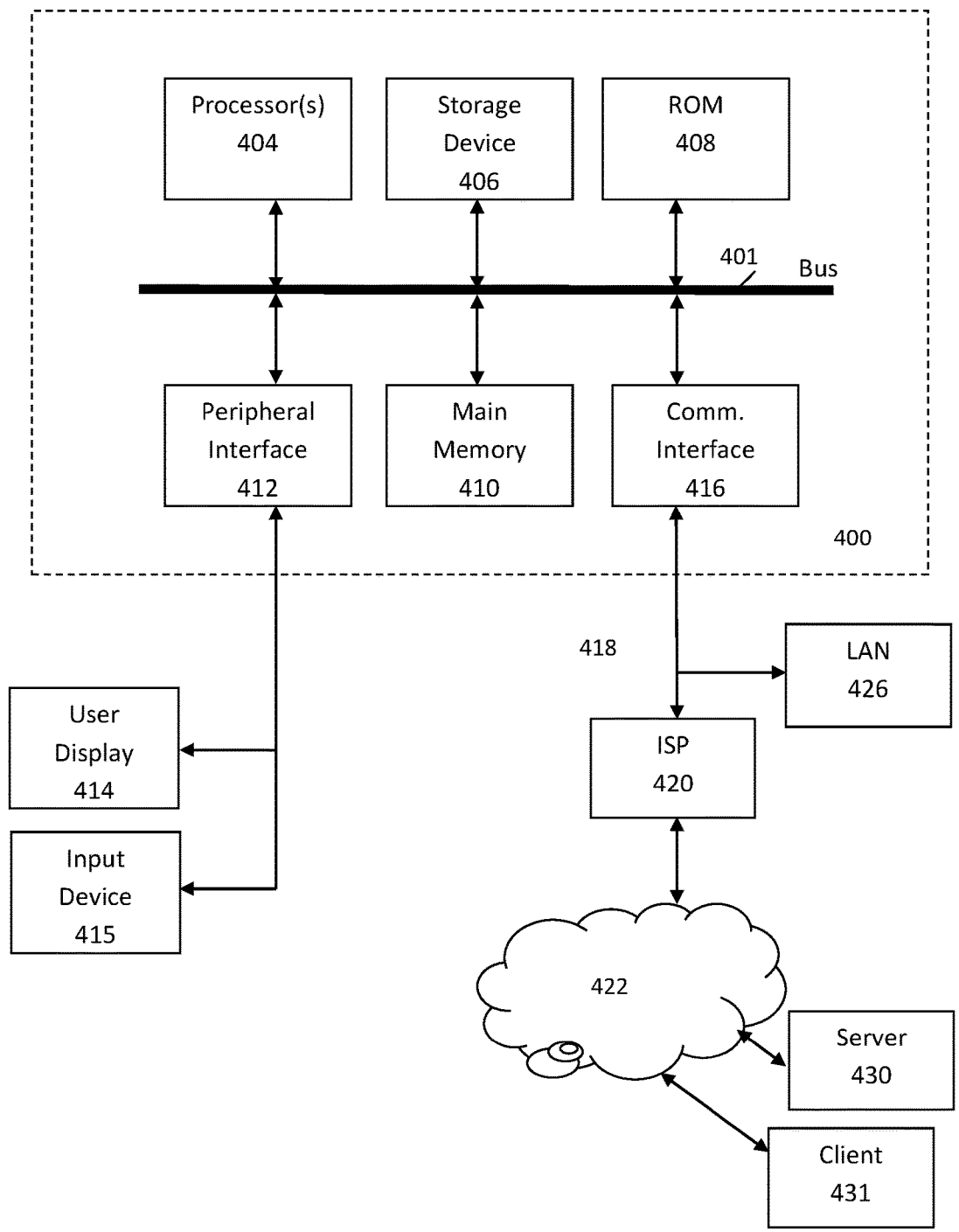
FIG. 4 is a block diagram illustrating hardware in a computer system that may be used to implement the teachings hereof.

FIG. 4 is a block diagram that illustrates hardware in a computer system 400 in which the embodiments of the invention may be implemented. The computer system 400 may be embodied in a client device, server, personal computer, workstation, tablet computer, wireless device, mobile device, network device, router, hub, gateway, or other device.

Computer system 400 includes a processor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 405. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 communicatively couples computer system 400 to a user display 414 that displays the output of software executing on the computer system, and an input device 415 (e.g., a keyboard, mouse, trackpad, touchscreen) that communicates user input and instructions to the computer system 400. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer, or otherwise) between the system bus 401 and an external communication link. The communication interface 416 provides a network link 418. The communication interface 416 may represent a Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 418 (e.g., following storage in an interface buffer, local memory, or other circuitry).

As previously indicated, the teachings hereof are particularly applicable to situations in which a web page has been coded for both mobile and wireline (e.g., a desktop) clients. In other words, the client may be a conventional desktop, laptop or other Internet-accessible machine running a web browser or other rendering engine, but may also be a mobile device running a mobile browser or other rendering engine. As used herein, a mobile device includes any wireless client device, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, the mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Further, the techniques disclosed herein are not limited to any particular mode or application layer for mobile device communications, such as web browsing with HTTP, email (SMTP), short message service (SMS), or otherwise.

It is noted that trademarks appearing herein are the property of their respective owners and used for identification and descriptive purposes only, given the nature of the subject matter at issue, and not to imply endorsement or affiliation in any way.

Pursuant to 37 CFR 1.96(b)(2), included below is a computer program listing representing one non-limiting implementation of some of the teachings herein. More specifically, the example computer program listed below is a Perl script representing one non-limiting implementation of steps of 1-3 of Algorithm 1.

```
#!/usr/bin/perl

#    (c) Copyright 2011-2012 Akamai Technologies, Inc. All rights
#    reserved.

#    Creates an HTTP proxy on localhost port 3128 that modifies
#    responsive design web pages in transit. Note that this demonstration
#    script is hardwired to assume output to an iPhone 3G model.
#    Expected output is that web pages viewed through this proxy are
#    visually identical or extremely similar, but have loaded after
#    downloading less bytes in total payload.

#    Tested with Perl 5.10.0 on Mac OS X 10.6.8
#    Library dependencies:
#    http://search.cpan.org/~book/HTTP-Proxy-0.25/lib/HTTP/Proxy.pm
#    http://search.cpan.org/~jcristy/PerlMagick-6.74/Magick.pm.in

#    Note that HTTP::Proxy v0.25 will decompress gzip Content-Encoding
#    but will not recompress the asset outbound. Therefore, for an
#    accurate comparison, configure your web browser not to send an
```

```
#    Accept-Encoding header, use an origin that does not employ gzip, or
#    alter HTTP::Proxy to perform a gzip step (not shown here) so that
#    the output is compressed.

#    Configure your web browser to send an iPhone 3G User-Agent, or
#    disable device detection below and hardcode a 320x480 screen size.

#    Although this script includes a trivial device identification
#    subroutine for illustrative purposes, typically a
#    more robust component would be relied upon.
use strict;
use HTTP::Proxy;
use HTTP::Proxy::HeaderFilter::simple;
use HTTP::Proxy::BodyFilter::simple;
use HTTP::Proxy::BodyFilter::complete;
use Image::Magick;
use constant PORT                  => 3128;
use constant DO_DEVICE_ID          => 1;
use constant NO_ID_DIMENSIONS      => [320, 480];
use constant DO_CSS_ELIDING        => 1;
use constant DO_IMAGE_RESIZING     => 1;
use constant DO_IMAGE_COMPRESSION  => 0;
use constant ASSUMED_PAGE_MARGIN   => 10;
run( );
sub run {
    my $proxy = create_proxy(PORT);
    print "Starting RD Accelerator Test...\n";
    $proxy->start;   # main loop
}
sub create_proxy {
    my ($port) = @_;
    my $proxy = HTTP::Proxy->new(port => $port);
    $proxy->push_filter(mime   => 'text/*',
               response => HTTP::Proxy::BodyFilter::complete->new,  #
ensure simple on next line gets whole body
               response => HTTP::Proxy::BodyFilter::simple-
>new(\&proxy_filter_css));
    $proxy->push_filter(mime   => 'image/*',
               response => HTTP::Proxy::BodyFilter::complete->new,  #
ensure simple on next line gets whole body
               response => HTTP::Proxy::BodyFilter::simple-
>new(\&proxy_filter_image));
    $proxy->push_filter(request => HTTP::Proxy::HeaderFilter::simple-
>new(\&proxy_print_uri));
    return $proxy;
}
sub proxy_filter_css {
    my ($self, $bodyref, $headers) = @_;
    return unless DO_CSS_ELIDING;
    return unless ${$bodyref};
    #print 'pre-process length: '.length(${$bodyref})."\n";
    my $device_dimensions = identify_device($headers->request-
>header('User-Agent'));
    return unless defined $device_dimensions;
    my $max = $device_dimensions->{width};
    ${$bodyref} =~ s/(\s*\@media +(?:screen +and +|) (?:\((?:min|max)-
width: *(\d+)px\))+(, print)?
*{([^{}]*{[^{}]*}[^{}]*)*?})/treat_css($1,$max)/gesm;
    ${$bodyref} =~ s/(\s*\@media
+print[^{]*{([^{}]*{[^{}]*}[^{}]*)*?})/treat_css($1,$max)/gesm;
    #print 'post-process length: '.length(${$bodyref})."\n";
}
sub treat_css {
    my ($css, $target_width) = @_;
    #print "In treat_css( )\n";
    if (my ($dimensions) = $css =~ m/\@media +(?:screen +and
+|)(\(\((?:min|max)-width: *\d+px\))+)/) {
        if ($dimensions =~ m/min-width: *(\d+)px/) {
            if ($1 > $target_width) {
    print "Skipped CSS section for min-width $1\n";
    #print $css."\n";
    return '';
            }
        }
        if ($dimensions =~ m/max-width: *(\d+)px/) {
            if ($1 < $target_width) {
    print "Skipped CSS section for max-width $1\n";
    #print $css."\n";
    return '';
```

```
            }
        }
    }
    if ($css =~ m/\@media +(print)/) {
        print "Skipped CSS section for media $1\n";
        #print $css."\n";
        return '';
    }
    return $css;
}
sub proxy_filter_image {
    my ($self, $bodyref, $headers) = @_;
    return unless DO_IMAGE_RESIZING or DO_IMAGE_COMPRESSION;
    return unless ${$bodyref};
    my $device_dimensions = identify_device($headers->request-
>header('User-Agent'));
    return unless defined $device_dimensions;
    my $max = $device_dimensions->{width};
    my $image_mime_type = do { local $_ = $headers->header('Content-
Type') || 'image/none'; s/;.*$//; $_; };
    my $image_filename = do { local $_ = $headers->request->uri->path;
s|^.*/||; $_; };
    my $target_width = $max - ASSUMED_PAGE_MARGIN; # 10px guaranteed
margin on the page (5px each side)
    my $newblob = treat_image(${$bodyref}, $image_mime_type,
$image_filename, $target_width);
    ${$bodyref} = $newblob if defined $newblob;
}
sub treat_image {
    my ($imageblob, $image_mime_type, $image_filename, $target_width) =
@_;
    #print "In treat_image( )\n";
    my $image = Image::Magick->new(magick => do { $image_mime_type =~
m|^image\/([a-z]+)$/; $1; });
    $image->BlobToImage($imageblob);
    #print "Image compression: ".($image->Get('compression') ||
'N/A').", quality: ".($image->Get('quality') || 'N/A')."\n";
    my $width = $image->Get('width') || 0;
    return if $width <= $target_width;
    if (DO_IMAGE_RESIZING) {
        print "Resizing image $image_filename from $width pixels wide to
$target_width pixels wide\n";
        $image->Resize(geometry => $target_width.'x');
    }
    if (DO_IMAGE_COMPRESSION) {
        my $quality = $image->Get('quality');
        $image->Set('quality', $quality - 10) if defined($quality) and
$quality >= 75;
    }
    my @blob = $image->ImageToBlob( );
    die if @blob == 0 or !defined($blob[0]);
    return $blob[0];
}
sub proxy_print_uri {
    my ($self, undef, $headers) = @_;
    print $headers->uri."\n";
}
sub identify_device {
        # this is an example - a more sophisticated mechanism would
        # typically be relied upon
    my ($user_agent) = @_;
    if (DO_DEVICE_ID) {
        if ($user_agent) {
            my @table = (['iPhone', 320, 480],
                ['Nexus S', 480, 800]);
            foreach (@table) {
    my ($fragment, $width, $height) = @{$_};
    if ($user_agent =~ /$fragment/) {
        print "Device is $fragment\n";
        return {width => $width, height => $height};
    }
            }
        }
        return;
    }
    my ($width, $height) = @{+NO_ID_DIMENSIONS};
    return {width => $width, height => $height};
}
```

The invention claimed is:

1. A method performed by an intermediary device that is connected to a computer network and that receives client requests for content and obtains content from an origin server, the method comprising, at the intermediary device:
   receiving a request for particular content from a client device, the particular content comprising an HTML document;
   determining one or more characteristics of the client device using information received with the client device's request for the particular content;
   obtaining the particular content requested by the client device, and examining the particular content to determine that the particular content at least one of: (a) includes CSS and (b) refers to a CSS file that includes CSS;
   wherein the CSS comprises a definition of a class, a display:none directive, and a logical expression that the client device is capable of executing to determine whether to apply the display:none directive to an HTML element associated with the class;
   evaluating the CSS based on the one or more characteristics of the client device, and based on said evaluation, determining that the client device's execution of the CSS, including the logical expression, would determine that the CSS instructs the client device to apply the display:none directive to an HTML element associated with the class, based on the one or more characteristics of the client device;
   based at least in part upon said evaluation of the CSS by the intermediary device, modifying the particular content by removing at least one HTML element therein that is associated with the class, thus reducing a size of the particular content;
   sending the modified particular content to the client device in response to the client device's request.

2. The method of claim 1, further comprising, wherein the at least one HTML element comprises a <DIV> tag.

3. The method of claim 1, wherein the one or more characteristics of the client device include any of: browser window width or height, screen width or height, display characteristics, user interface characteristics.

4. The method of claim 1, further comprising caching the modified particular content.

5. The method of claim 1, wherein obtaining the content comprises requesting and receiving the particular content from an origin web server.

6. The method of claim 1, wherein the intermediary device comprises a reverse proxy server.

7. The method of claim 1, wherein the particular content: (a) includes CSS.

8. The method of claim 1, wherein the particular content: (b) refers to a CSS file that includes CSS.

9. Apparatus connected to a computer network and that receives client requests for content and obtaining content from an origin server, comprising:
   circuitry forming one or more processors and memory storing instructions to executed by the one or more processors, where execution of the stored instructions will cause the apparatus to:
   receive a request for particular content from a client device, the particular content comprising an HTML document;
   determine one or more characteristics of the client device using information received with the client device's request for the particular content;
   obtain the particular content requested by the client device, and examine the particular content to determine that the particular content at least one of: (a) includes CSS and (b) refers to a CSS file that includes CSS;
   wherein the CSS comprises a definition of a class, a display:none directive, and a logical expression that the client device is capable of executing to determine whether to apply the display:none directive to an HTML element associated with the class;
   evaluate the CSS based on the one or more characteristics of the client device, and based on said evaluation, determine that the client device's execution of the CSS, including the logical expression, would determine that the CSS instructs the client device to apply the display:none directive to an HTML element associated with the class, based on the one or more characteristics of the client device;
   based at least in part upon said evaluation of the CSS by the intermediary device, modify the particular content by removing at least one HTML element therein that is associated with the class, thus reducing a size of the particular content;
   send the modified particular content to the client device in response to the client device's request.

10. The apparatus of claim 9, further comprising, wherein the at least one HTML element comprises a <DIV> tag.

11. The apparatus of claim 9, wherein the one or more characteristics of the client device include any of: browser window width or height, screen width or height, display characteristics, user interface characteristics.

12. The apparatus of claim 9, wherein the apparatus caches the modified particular content.

13. The apparatus of claim 9, wherein the apparatus obtains the particular content at least by requesting and receiving the particular content from an origin web server.

14. The apparatus of claim 9, wherein the apparatus comprises a reverse proxy server.

15. The apparatus of claim 9, wherein the particular content: (a) includes CSS.

16. The apparatus of claim 9, wherein the particular content: (b) refers to a CSS file that includes CSS.

* * * * *